United States Patent
Lapp

(10) Patent No.: US 9,449,485 B2
(45) Date of Patent: Sep. 20, 2016

(54) FLAME DETECTOR HAVING VISIBLE LIGHT RELATED PROCESSING CIRCUITS AND INFRARED RELATED CIRCUITS RESPECTIVELY COUPLED TO PHOTODIODES TO ESTABLISH INSTANTANEOUS DC RELATED SIGNAL CHANGES AND PEAK-TO-PEAK AC SIGNALS OVER A PREDETERMINED TIME INTERVAL

(71) Applicant: Honeywell International Inc., Morristown, NJ (US)

(72) Inventor: Theodore Raymond Lapp, Coto de Caza, CA (US)

(73) Assignee: Honeywell International Inc., Morris Plains, NJ (US)

( * ) Notice: Subject to any disclaimer, the term of this patent is extended or adjusted under 35 U.S.C. 154(b) by 74 days.

(21) Appl. No.: 14/476,094

(22) Filed: Sep. 3, 2014

(65) Prior Publication Data

US 2016/0063831 A1 Mar. 3, 2016

(51) Int. Cl.
G08B 17/12 (2006.01)
G01J 5/08 (2006.01)
G08B 29/18 (2006.01)

(52) U.S. Cl.
CPC ............ G08B 17/12 (2013.01); G01J 5/0862 (2013.01); G08B 29/188 (2013.01)

(58) Field of Classification Search
CPC ...... G08B 17/12; G08B 17/00; A62C 35/11; G01J 5/08

USPC ............ 250/554, 221, 205, 339.05, 339.14, 250/339.15; 340/555–557
See application file for complete search history.

(56) References Cited

U.S. PATENT DOCUMENTS

| | | | |
|---|---|---|---|
| 4,370,557 A | 1/1983 | Axmark et al. | |
| 4,742,236 A | 5/1988 | Kawakami et al. | |
| 6,507,023 B1 | 1/2003 | Parham et al. | |
| 8,547,238 B2 * | 10/2013 | Harchanko | G08B 17/12 340/286.05 |
| 2002/0011570 A1 | 1/2002 | Castleman | |
| 2003/0178568 A1 | 9/2003 | Parham et al. | |
| 2013/0068933 A1 | 3/2013 | Petrovic | |
| 2014/0084166 A1 | 3/2014 | Cole | |

OTHER PUBLICATIONS

Product Literature for Fire Sentry FS20X Detector, © 2012 Honeywell Analytics, H_FireSentry_FS20X_DS01125_V1_EMEAI Dec. 2012.
EP15182238.4, Extended European Search Report, mailed Jan. 29, 2016, 11 pages.

* cited by examiner

*Primary Examiner* — Que T Le
(74) *Attorney, Agent, or Firm* — Conley Rose, P.C.; Kristin Jordan Harkins

(57) ABSTRACT

A flame detector incorporates visible and near infrared sensors in common with processing circuits to form processed instantaneous, dc type, signal values minus an average value and peak-to-peak ranges of values of ac-type signals over a measurement time interval on the order of three seconds. The resulting values are further processed to determine the presence of a fire condition by comparing them to a predetermined threshold.

15 Claims, 3 Drawing Sheets

Flame sensing using nearband IR temporal signal processing

FLAME DETECTOR HAVING VISIBLE LIGHT RELATED PROCESSING CIRCUITS AND INFRARED RELATED CIRCUITS RESPECTIVELY COUPLED TO PHOTODIODES TO ESTABLISH INSTANTANEOUS DC RELATED SIGNAL CHANGES AND PEAK-TO-PEAK AC SIGNALS OVER A PREDETERMINED TIME INTERVAL

FIELD

The application pertains to flame detectors and methods of detecting the presence of flames in regions of interest. More particularly, the application pertains to such systems and methods which sense visible light and near band infrared to provide prompt and reliable reporting of the presence of flames in a region of interest.

BACKGROUND

Various known flame detectors evaluate optical signals of various wavelengths to determine the presence of fire. In general, this requires the use of special sensors and optical filters in order to distinguish fire from non-fire optical sources.

For example, multi-sensor detectors are disclosed in U.S. Pat. No. 4,370,557 entitled, "Dual Detector Flame Sensor," which issued Jan. 25, 1983, U.S. Publication No. 2013/0068933 entitled, "Flame Detector Using Optical Sensing," published Mar. 21, 2013, both of which are assigned to the Assignee hereof and incorporated herein by reference. U.S. Publication No. 2003/0178568, which published Sep. 25, 2003, discloses yet another form of multi sensor flame detector.

Some of the known detectors incorporate costly lead-salt quantum sensors, thermopiles, and pyroelectric sensors. Others use specialized narrowband thin-film optical interference filters. Further, some of the known detectors are limited to sensing only burning hydrocarbons.

DETAILED DESCRIPTION

Figure 1:
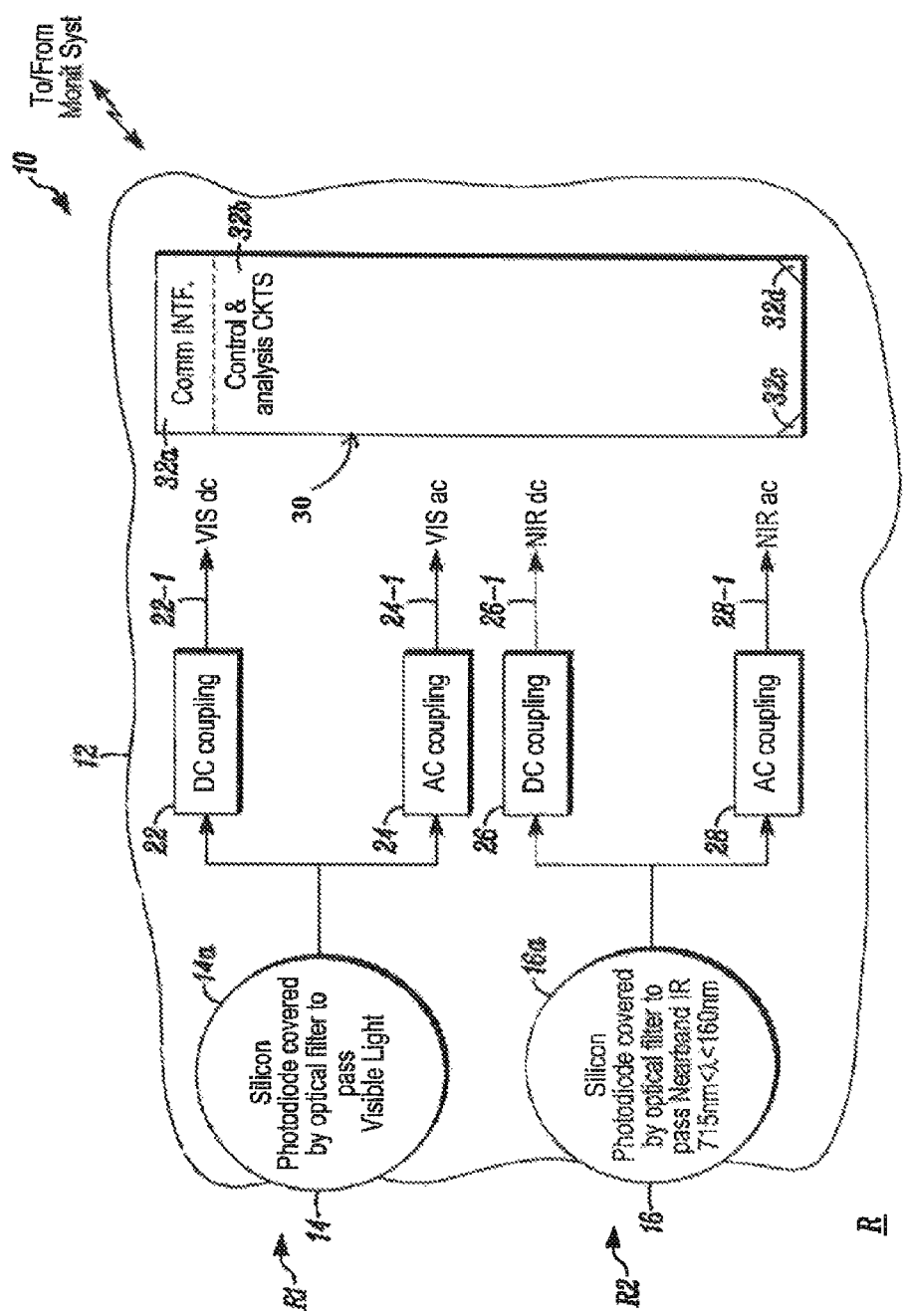
FIG. 1 illustrates a block diagram of a flame detector in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect, embodiments hereof incorporate low-cost nearband infrared and visible light photodiodes in conjunction with amplitude based temporal signal processing algorithms to establish presence or absence of a fire. In yet another aspect, the use of inexpensive photodiodes as the only required sensing devices works well in indoor, controlled-environment applications.

FIG. 1 is a block diagram of a flame detector 10 in accordance herewith. Detector 10 includes a housing 12 which carries first and second optical filters 14, 16 oriented to receive incoming radiant energy, R1, R2 from a region R being monitored.

Filter 14 transmits incoming visible light (VL). Filter 16 transmits incoming nearband infrared (IR), for example 715 nm to 1100 nm wavelengths.

Optical sensors 14a, 16a are optically coupled to the respective filters 14, 16 and receive incoming radiant energy therefrom. Advantageously, sensors 14a, 16a can be implemented with relatively inexpensive silicon photodiodes. Other types of optical sensors come within the spirit and scope hereof.

Radiant energy generated outputs from the sensors 14a, 16a are coupled to processing circuits 22, 24 and 26, 28 respectively. Processing circuits 22, 26 generate, on lines 22-1 and 26-1, DC variation, or delta, signals corresponding to instantaneous received amplitude signal values minus an average value of such signals, from each respective sensor 14a, 16a. Processing circuits 24, 28 generate on lines 24-1 and 28-1, an estimated range of values of incoming AC peak-to-peak signals over a measurement time on the order of three seconds.

The processed signals on lines 22-1 to 28-1 are coupled to circuits 30. Circuits 30 can include a communications interface 32a and control and analysis circuits 32b. The circuits 32b can be implemented, at least in part, by one or more programmable processors 32c and associated, executable, control software 32d.

As those of skill will understand, the communications interface 32a can be Internet enabled and provide wireless communications to/from a displaced monitoring system. Wired transmissions could also be used.

Figure 2A:
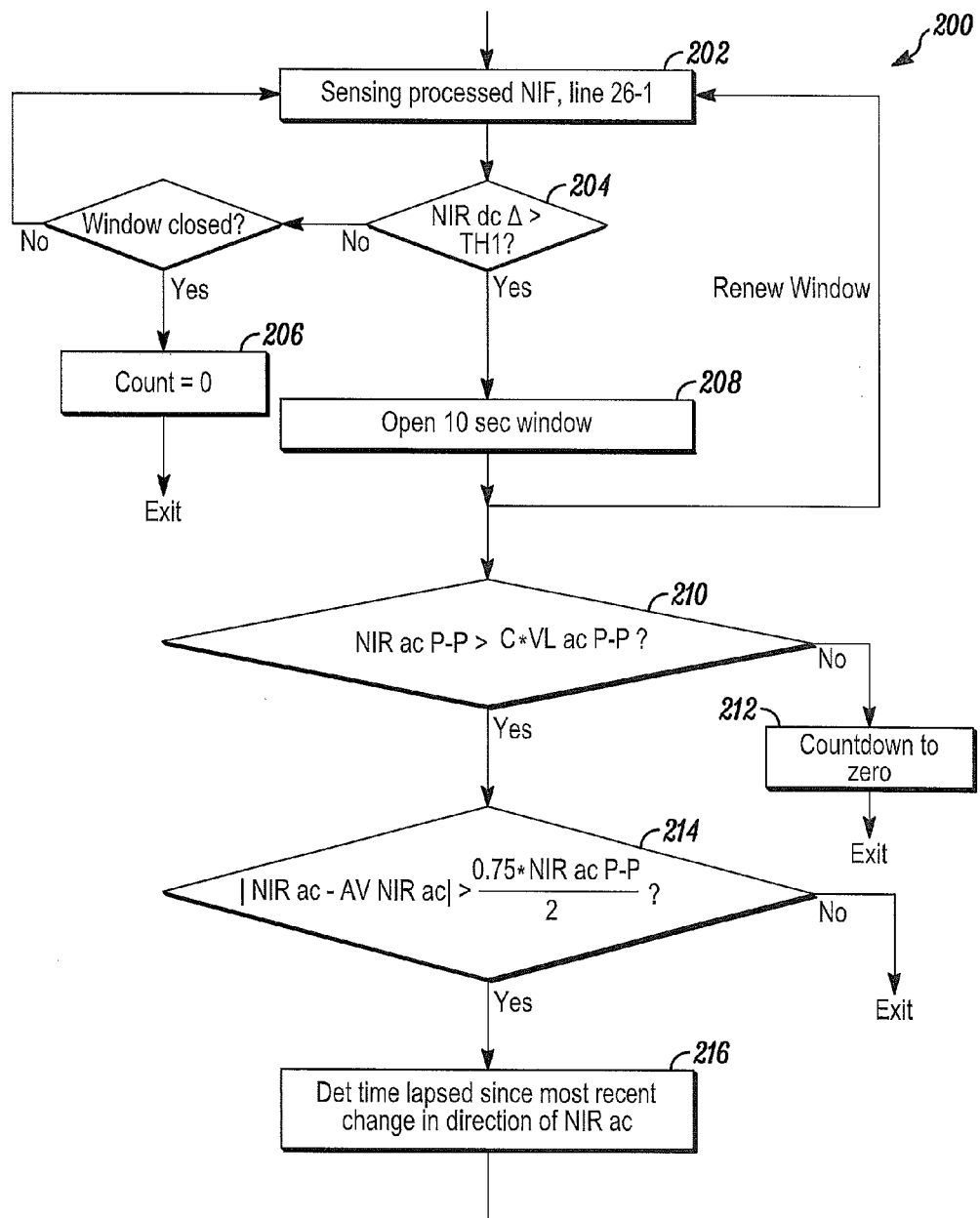
FIGS. 2A and 2B taken together are a flow diagram of processing as implemented by a detector as in FIG. 1 in determining the presence of a fire condition.
Figure 2B:
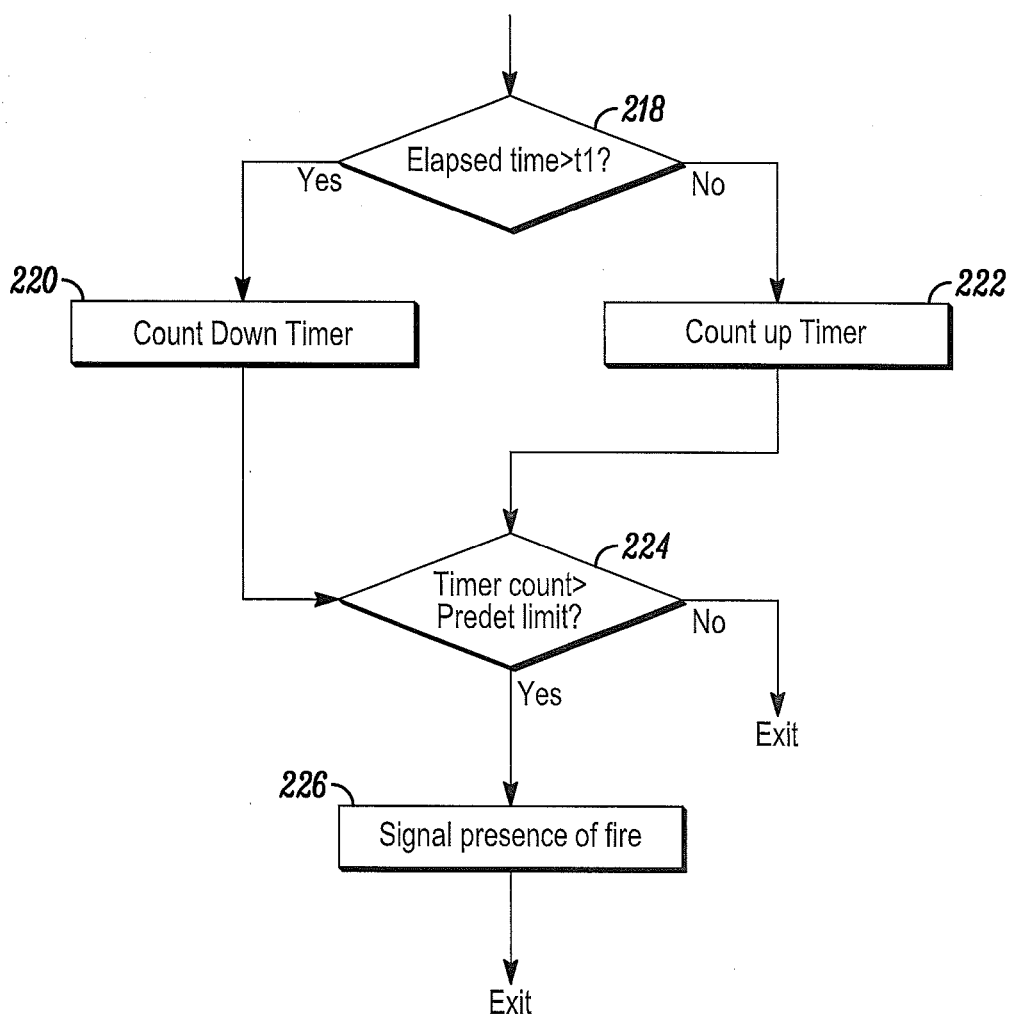

Signals on lines 22-1 to 28-1 can be processed in accordance with the method 200 illustrated in FIGS. 2A, 2B. The processing of signals from sensors 14a, 16a, via circuit pairs 22, 26 and 24, 28 is substantially identical. Subsequent to the below described processing, based on processed signals lines 22-1 . . . 28-1, circuitry 30 can make a determination as to the presence of a fire condition in the region R. A fire indicating alarm message can then be sent via interface 32a to the monitoring system, or to other destinations without limitation.

Initially, processed near-infrared, line 26-1, is sensed, as at 202. When the NIR dc delta signal exceeds threshold 1, as at 204, a ten second window is opened as at 208. This window is kept opened so long as the threshold is exceeded. When the window is closed, a counter is zeroed, as at 206, and the process exits.

Subsequently, as at 210, a determination is made if the NIR ac peak-to-peak signal, line 28-1, exceeds a constant "c" times the VL ac peak-to-peak signal, line 24-1. The constant "c" can be set to the value of "3" initially.

If not, as at 212, the counter can be counted down to zero and the process exited. If the threshold in 210 is exceeded, the NIR ac signal is reduced by the average NIR as signal and that absolute value is compared to the NIR ac peak-to-peak signal, line 28-1, divided by two and multiplied by 0.75.

If the threshold has not been exceeded, as at 214, the process exits. Otherwise, time lapsed since the most recent change in direction of NIR ac signal, line 28-1, is determined, as at 216. If the elapsed time exceeds a threshold, as at 218, namely t1, the timer is counted down, as at 220. Otherwise, the timer is counted up as at 222. The time t1 can be on the order of 100 milliseconds.

If the count in the timer fails to exceed a predetermined limit, as at 224, the process exits. Otherwise the control circuits 32*b* signal the presence of a fire condition, as at 226, and then the process exits.

In summary, a flame detector incorporates visible and near infrared sensors in common with processing circuits to form processed instantaneous, dc type, signal values minus an average value and peak-to-peak ranges of values of ac-type signals over a measurement time interval on the order of three seconds. The resulting values are further processed to determine the presence of a fire condition by comparing them to a predetermined threshold.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be added to or removed from the described embodiments.

The invention claimed is:

1. A flame detector comprising:
a first, visible light sensing photodiode;
visible light related processing circuits, coupled to the first photodiode to establish instantaneous dc related signal changes and peak-to-peak ac signals over a predetermined time interval;
a second, near infrared sensing photodiode;
infrared related processing circuits, coupled to the second photodiode to establish instantaneous dc related signal changes and peak-to-peak ac signals over a predetermined time interval; and
control circuits to determine the presence of a fire condition using amplitude components of the processed visible light and near infrared signals.

2. A detector as in claim 1 where a respective filter is associated with each photodetector.

3. A detector as in claim 1 where the visible light processing circuits and the near infrared processing circuits establish dc related signal values based on instantaneous signal values reduced by an average signal value.

4. A detector as in claim 1 where a range of established ac related values is based on a predetermined measurement time.

5. A detector as in claim 3 where a respective filter is associated with each photodiode.

6. A detector as in claim 5 where a range of established ac related values is based on a predetermined measurement time.

7. A detector as in claim 1 where additional circuits establish a measurement window for the presence of near infrared signals.

8. A detector as in claim 7 where additional circuits detect that the near infrared dc signal exceeds a predetermined threshold, and in response thereto, opens a window of a predetermined minimum length.

9. A detector as in claim 8 where a determination is made whether a processed near infrared ac signal exceeds a threshold based on a visible light related signal.

10. A detector as in claim 9 where a time interval that has passed since a most recent change in direction of the near infrared related signal is determined.

11. A method of operating a visible light sensor and a near infrared sensor to make a fire determination comprising:
providing a visual light sensor and a near infrared sensor;
processing selected amplitude values of signals received from the sensors;
establishing that an amplitude of a near infrared processed signal exceeds a predetermined threshold;
establishing a renewal window of a predetermined minimum duration; and
determining, using at least the processed amplitude values for both sensors, the presence of a fire.

12. A method as in claim 11 where processing includes forming instantaneous signal values reduced by an average value for each sensor.

13. A method as in claim 11 which includes forming ac peak-to-peak signal values over a predetermined measurement time interval.

14. A method as in claim 13 where processing includes forming instantaneous signal values reduced by an average value for each sensor.

15. A method as in claim 14 which includes comparing a timer count to a predetermined value, and responsive thereto, signaling the presence of a fire.

* * * * *

UNITED STATES PATENT AND TRADEMARK OFFICE
CERTIFICATE OF CORRECTION

PATENT NO. : 9,449,485 B2  
APPLICATION NO. : 14/476094  
DATED : September 20, 2016  
INVENTOR(S) : Theodore Raymond Lapp Page 1 of 1

It is certified that error appears in the above-identified patent and that said Letters Patent is hereby corrected as shown below:

On the Title Page

Item (54) and in the Specification, Column 1/Line 3: "INFRARED RELATED CIRCUITS" should be "INFRARED RELATED PROCESSING CIRCUITS"

Signed and Sealed this
Eleventh Day of December, 2018

Andrei Iancu
*Director of the United States Patent and Trademark Office*